(12) United States Patent
Okazaki et al.

(10) Patent No.: US 12,542,299 B2
(45) Date of Patent: Feb. 3, 2026

(54) LITHIUM SECONDARY BATTERY (71) Applicant: Panasonic Intellectual Property Management Co., Ltd., Osaka (JP)

(72) Inventors: Tomohisa Okazaki, Osaka Fu (JP); Akira Kano, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 649 days.

(21) Appl. No.: 17/599,358

(22) PCT Filed: Feb. 17, 2020

(86) PCT No.: PCT/JP2020/006117
§ 371 (c)(1),
(2) Date: Sep. 28, 2021

(87) PCT Pub. No.: WO2020/202844
PCT Pub. Date: Oct. 8, 2020

(65) Prior Publication Data
US 2022/0190379 A1 Jun. 16, 2022

(30) Foreign Application Priority Data
Mar. 29, 2019 (JP) .................. 2019-066975

(51) Int. Cl.
*H01M 10/052* (2010.01)
*H01M 4/02* (2006.01)
(Continued)

(52) U.S. Cl.
CPC ......... *H01M 10/052* (2013.01); *H01M 4/131* (2013.01); *H01M 4/134* (2013.01);
(Continued)

(58) Field of Classification Search
CPC .... H01M 10/052; H01M 4/131; H01M 4/134; H01M 4/662; H01M 10/056; H01M 2004/027; H01M 2004/028
See application file for complete search history.

(56) References Cited

U.S. PATENT DOCUMENTS

| | | | |
|---|---|---|---|
| 2001/0018935 A1 | 9/2001 | Castellano | |
| 2011/0177364 A1* | 7/2011 | Miyazaki | H01M 4/62 429/53 |

(Continued)

FOREIGN PATENT DOCUMENTS

| | | |
|---|---|---|
| CN | 103700860 A | 4/2014 |
| CN | 105103343 A | 11/2015 |

(Continued)

OTHER PUBLICATIONS

International Search Report dated Apr. 14, 2020, issued in counterpart International application No. PCT/JP2020/006117, with English translation. (9 pages).

(Continued)

*Primary Examiner* — Nicole M. Buie-Hatcher
*Assistant Examiner* — Taylor Harrison Krone
(74) *Attorney, Agent, or Firm* — WHDA, LLP (57) ABSTRACT

A lithium secondary battery including a positive electrode including a positive electrode material mixture containing a positive electrode additive, a negative electrode, a separator, and an electrolyte. The positive electrode additive includes at least one selected from the group consisting of a first compound represented by formula (1): $Li_{a1}Fe_{x1}M1_{y1}O_{z1}$ and a second compound represented by formula (2): $Li_{a2}Ni_{x2}M2_{y2}O_{z2}$. The formula (1) satisfies $0 \le a1 \le 5$, $0 \le x1 \le 5$, $0 \le y1 \le 1$, and $0 \le z1 \le 4$, where at least two of a1, x1, y1 and z1 are greater than 0. The formula (2) satisfies $0 \le a2 \le 2$, $0 \le x2 \le 1$, $0 \le y2 \le 1$, and $1 \le z2 \le 2$, where at least one of a2 and x2 is greater than 0. The electrolyte contains an (Continued)

oxalate complex salt having an oxalate complex anion and a lithium ion.

6 Claims, 3 Drawing Sheets

(51) Int. Cl.
 *H01M 4/131* (2010.01)
 *H01M 4/134* (2010.01)
 *H01M 4/66* (2006.01)
 *H01M 10/056* (2010.01)

(52) U.S. Cl.
 CPC ......... *H01M 4/662* (2013.01); *H01M 10/056* (2013.01); *H01M 2004/027* (2013.01); *H01M 2004/028* (2013.01)

(56) References Cited

U.S. PATENT DOCUMENTS

| | | | | |
|---|---|---|---|---|
| 2013/0065136 A1* | 3/2013 | Sasaki | ................... | H01M 4/505 429/341 |
| 2014/0220455 A1 | 8/2014 | Lee et al. | | |
| 2015/0044533 A1* | 2/2015 | Tode | ..................... | H01M 50/40 429/94 |
| 2015/0372304 A1 | 12/2015 | Hasegawa et al. | | |
| 2016/0351905 A1* | 12/2016 | Kawamura | ....... | H01M 10/0525 |
| 2017/0346070 A1 | 11/2017 | Kim et al. | | |
| 2019/0006714 A1 | 1/2019 | Kano et al. | | |
| 2020/0083525 A1* | 3/2020 | Lee | ........................ | H01M 4/382 |
| 2021/0013501 A1 | 1/2021 | Okazaki et al. | | |
| 2021/0043970 A1 | 2/2021 | Sadakane | | |
| 2021/0111429 A1 | 4/2021 | Minami et al. | | |

FOREIGN PATENT DOCUMENTS

| | | |
|---|---|---|
| CN | 107437610 A | 12/2017 |
| JP | 2001-243957 A | 9/2001 |
| JP | 2002-237293 A | 8/2002 |
| JP | 2017-168255 A | 9/2017 |
| JP | 2019-009113 A | 1/2019 |
| WO | 2018/179782 A1 | 10/2018 |
| WO | 2019/181277 A1 | 9/2019 |
| WO | 2019/181278 A1 | 9/2019 |

OTHER PUBLICATIONS

Office Action dated Dec. 28, 2023, issued in counterpart CN Application No. 202080023839.0, with partial English translation. (10 pages).

* cited by examiner

LITHIUM SECONDARY BATTERY

TECHNICAL FIELD

The present disclosure relates to a lithium secondary battery using lithium metal as a negative electrode active material.

BACKGROUND ART

Non-aqueous electrolyte secondary batteries are used for ICT devices, such as personal computers and smart phones, automobiles, power storage systems, and other applications. For the non-aqueous electrolyte secondary batteries used for such applications, further improvement in their capacity has been required. One known example of a non-aqueous electrolyte secondary battery with high capacity is a lithium ion battery. However, the improvement in capacity of the lithium ion battery is approaching to its limit.

As a non-aqueous electrolyte secondary battery superior in capacity to the lithium ion battery, a lithium secondary battery is seen as promising (Patent Literature 1). In the lithium secondary battery, lithium metal deposits on the negative electrode during charge, and the deposited lithium metal dissolves in the non-aqueous electrolyte during discharge. The lithium secondary battery is also called a lithium metal secondary battery.

CITATION LIST

Patent Literature

[PTL 1] Japanese Laid-Open Patent Publication No. 2001-243957

SUMMARY OF INVENTION

Technical Problem

In a lithium (metal) secondary battery, the deposition form of lithium metal on the negative electrode is difficult to control. It has been desired to prevent the deposition of lithium metal in a dendritic form and suppress the side reaction between the lithium metal and electrolyte, and thus to improve the cycle characteristics. One objective of the present disclosure is to provide a lithium secondary battery excellent in cycle characteristics.

Solution to Problem

One aspect of the present disclosure relates to a lithium secondary battery, including: a positive electrode including a positive electrode material mixture containing a positive electrode active material and a positive electrode additive; a negative electrode including a negative electrode current collector; a separator disposed between the positive electrode and the negative electrode; and an electrolyte, wherein
on the negative electrode, lithium metal deposits during charge and the lithium metal dissolves in the electrolyte during discharge,
the positive electrode additive includes at least one selected from the group consisting of a first compound represented by a general formula (1): $Li_{a1}Fe_{x1}M1_{y1}O_{z1}$ and a second compound represented by a general formula (2): $Li_{a2}Ni_{x2}M2_{y2}O_{z2}$,
the general formula (1) satisfies $0 \leq a1 \leq 5$, $0 \leq x1 \leq 5$, $0 \leq y1 \leq 1$, and $0 \leq z1 \leq 4$,
where at least two of a1, x1, y1 and z1 are greater than 0,
the M1 includes at least one selected from the group consisting of Co, Cu, Mg, Ni, Mn, Zn, Al, Ga, Ge, Ti, Si, Sn, Ce, Y, Zr, S, and Na,
the general formula (2) satisfies $0 \leq a2 \leq 2$, $0 \leq x2 \leq 1$, $0 \leq y2 \leq 1$, and $1 \leq z2 \leq 2$,
where at least one of a2 and x2 is greater than 0,
the M2 includes at least one selected from the group consisting of Co, Cu, Mg, Fe, Mn, Zn, Al, Ga, Ge, Ti, Si, Sn, Ce, Y, Zr, S, and Na, and
the electrolyte contains an oxalate complex salt having an oxalate complex anion and a lithium ion.

Advantageous Effects of Invention

In the lithium secondary battery, excellent cycle characteristics can be achieved.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

A lithium secondary battery according to the present disclosure includes a positive electrode including a positive electrode material mixture containing a positive electrode active material and a positive electrode additive, a negative electrode including a negative electrode current collector, a separator disposed between the positive electrode and the negative electrode, and an electrolyte containing an oxalate complex salt. On the negative electrode, lithium metal deposits during charge and the lithium metal dissolves in the electrolyte during discharge. In the lithium secondary battery, for example, 50% or more, further, 80% or more or substantially 100% of its reversible capacity is developed by the deposition and dissolution of lithium metal. The negative electrode current collector may be a copper foil or a copper alloy foil.

In a typical lithium secondary battery, when the lithium metal on the negative electrode current collector dissolves in the discharging process, a side reaction occurs between the lithium metal and the electrolyte. The product of the side reaction becomes an irreversible capacity, which is one of the causes of the degradation in cycle characteristics.

On the other hand, when the electrolyte contains an oxalate complex salt having an oxalate complex anion and a lithium ion, by the action of the oxalate complex anion, the deposition form of lithium metal is controlled, and the lithium metal is unlikely to deposit in a dendritic form. As a result, the surface area of the deposited lithium metal decreases, and the side reaction is suppressed, and thus, the cycle characteristics can be improved.

The study by the present inventors has found that the side reaction between the lithium metal and the electrolyte proceeds significantly, especially at the final stage of discharge, in the vicinity of the negative electrode current collector. The study has also found that using an electrolyte containing an oxalate complex salt is not sufficient to suppress the side reaction at the final stage of discharge. On the other hand, when the positive electrode material mixture contains a certain positive electrode additive, lithium metal is supplied from the positive electrode additive onto the surface of the negative electrode current collector during the first charge. At least part of the positive electrode additive from which lithium has been dissociated decomposes and does not absorb lithium ions, leading to a charge capacity that cannot be reversed. That is, after the first charge, in a fully discharged condition, the surface of the negative electrode current collector constantly has lithium metal deposited thereon which cannot return to the positive electrode. When the negative electrode current collector is constantly covered with a lithium metal layer derived from the positive electrode additive, the side reaction in the vicinity of the negative electrode current collector can be significantly suppressed. In other words, by using an electrolyte containing an oxalate complex salt and a positive electrode additive in combination, the side reaction can be suppressed throughout the discharging process, and thus, the cycle characteristics can be improved.

The positive electrode additive includes at least one selected from the group consisting of a first compound represented by a general formula (1): $Li_{a1}Fe_{x1}M1_{y1}O_{z1}$ and a second compound represented by a general formula (2): $Li_{a2}Ni_{x2}M2_{y2}O_{z2}$. The first compound typically has a compositional formula of $Li_5FeO_4$, and the second compound typically has a compositional formula of $Li_2NiO_2$.

The general formula (1) satisfies $0 \leq a1 \leq 5$, $0 \leq x1 \leq 5$, $0 \leq y1 \leq 1$, and $0 \leq z1 \leq 4$, where at least two of a1, x1, y1 and z1 are greater than 0. Before the first charge, at least a1 is not 0, and the first compound contains Li. The a1, x1, y1, and z1 may satisfy $0 < a1 \leq 5$, $0 \leq x1 \leq 5$, $0 \leq y1 \leq 1$, and $1 \leq z1 \leq 4$. Before the first charge, the a1, x1, y1, and z1 may satisfy, for example, $4 \leq a1 \leq 5$, $0.8 \leq x1 \leq 1$, $x1+y1=1$, $3.5 \leq z1 \leq 4$.

The general formula (1) shows that the first compound includes a lithium iron-containing oxide and/or a decomposition product thereof. The lithium iron-containing oxide may have an antifluorite type crystal structure. During charge, lithium ions are released from the lithium iron-containing oxide. At this time, at least part of the lithium iron-containing oxide decomposes, leaving a decomposition product in the positive electrode material mixture. By the positive electrode additive, a lithium metal layer is formed on the negative electrode current collector, suppressing the side reaction especially at the final stage of discharge, and by the action of the oxalate complex anion, a smooth lithium metal layer can be formed on the surface of the negative electrode current collector.

The M1 includes at least one selected from the group consisting of Co, Cu, Mg, Ni, Mn, Zn, Al, Ga, Ge, Ti, Si, Sn, Ce, Y, Zr, S, and Na. In view of suppressing gas generation and the like, the M1 may include at least one of Mn and Al.

The general formula (2) satisfies $0 \leq a2 \leq 2$, $0 \leq x2 \leq 1$, $0 \leq y2 \leq 1$, and $1 \leq z2 \leq 2$, where at least one of a2 and x2 is greater than 0. Before the first charge, at least a2 is greater than 1. The a2, x2, y2, and z2 may satisfy $1 \leq a2 \leq 2$, $0 \leq x2 \leq 1$, $0 \leq y2 \leq 1$, and $1 \leq z2 \leq 2$. Before the first charge, the a2, x2, y2, and z2 may satisfy, for example, $1 < a2 \leq 2$, $0.8 \leq x2 \leq 1$, $x2+y2=1$, and $1.5 \leq z2 \leq 2$.

The general formula (2) shows that the second compound includes a lithium nickel-containing oxide and/or a decomposition product thereof. The lithium nickel-containing oxide may have a rock-salt type layered crystal structure. During charge, lithium ions are released from the lithium nickel-containing oxide. At this time, at least part of the lithium nickel-containing oxide decomposes, leaving a decomposition product in the positive electrode material mixture. By the positive electrode additive, a lithium metal layer is formed on the negative electrode current collector, suppressing the side reaction especially at the final stage of discharge, and by the action of the oxalate complex anion, a smooth lithium metal layer can be formed on the surface of the negative electrode current collector. The decomposition product of the lithium nickel-containing oxide can have a rock-salt type layered structure, which, however, is a relatively irregular crystal structure and can be easily distinguished from a positive electrode active material having a typical rock-salt type layered structure.

The M2 includes at least one selected from the group consisting of Co, Cu, Mg, Fe, Mn, Zn, Al, Ga, Ge, Ti, Si, Sn, Ce, Y, Zr, S, and Na.

The first compound and the second compound both have a large charge capacity. Therefore, the positive electrode additive is effective even when a small amount is used. For example, the content of the positive electrode additive in the positive electrode material mixture may be 0.1 mass % or more and 20 mass % or less, and may be 0.1 mass % or more and 5 mass % or less, relative to the whole amount of the positive electrode material mixture.

When the content of the positive electrode additive in the positive electrode material mixture is 0.1 mass % or more relative to the whole amount of the positive electrode material mixture, the lithium metal layer can be formed on the negative electrode current collector in an amount sufficient for suppressing the side reaction, and the deterioration of cycle characteristics tends to be suppressed. On the other hand, when the content of the positive electrode additive in the positive electrode material mixture is 20 mass % or less, a larger amount of positive electrode active material can be contained in the positive electrode, and a high capacity and excellent cycle characteristics tends to be obtained. The content of the positive electrode additive in the positive electrode material mixture is determined by, for example, an X-ray diffractometry (XRD), a Möessbauer spectroscopy, and the like.

The positive electrode material mixture may include, as the first compound, for example, at least one selected from the group consisting of $Li_5FeO_4$, $Li_4Fe_4$, $LiFeO_2$, $Li_2O$, and $Fe_2O_3$. In the case where $Li_5FeO_4$ is added to or contained in the positive electrode material mixture when producing a positive electrode or before the first charge, the decomposition product of the first compound after the first charge includes, for example, at least one selected from the group consisting of $Li_4Fe_4$, $LiFeO_2$, $Li_2O$, and $Fe_2O_3$.

The positive electrode material mixture may include, as the second compound, for example, at least one selected from the group consisting of $Li_2NiO_2$, $LiNiO_2$, NiO, and $Li_2O$. In the case where $Li_2NiO_2$ is added to or contained in the positive electrode material mixture when producing a positive electrode or before the first charge, the decomposition product of the second compound after the first charge includes, for example, at least one selected from the group consisting of $Li_2NiO_2$, $LiNiO_2$, NiO, and $Li_2O$.

In the case of adding a positive electrode additive to the positive electrode material mixture layer, even when a lithium metal layer is not present on the surface of the negative electrode current collector before the first charge, in a fully discharged condition after the first charge, a lithium metal layer can be constantly present on the surface of the negative electrode current collector. The thickness of the lithium metal layer is not limited, but when the battery is in a fully discharged condition, for example, 5 µm or more and 30 µm or less, and may be 5 µm or more and 15 µm or less.

Note that the lithium metal layer to be formed on the surface of the negative electrode current collector is formed by electrochemical deposition within the battery, and in this point, structurally different from a lithium metal layer which is possibly formed in advance on the surface of the negative electrode current collector before incorporated into a battery. For example, it is possible to form a lithium metal layer by attaching a lithium metal foil or vapor-depositing lithium metal into a film, in advance, onto the surface of a negative electrode current collector before incorporated into a battery. However, forming a lithium metal layer in such a manner on the surface of the negative electrode current collector requires complicated processes. Moreover, a lithium metal layer formed by electrochemical deposition is different in composition, density, and the like from a lithium metal formed by a method other than the electrochemical method. For example, a lithium metal layer formed in advance before incorporated into a battery may contain a large amount of lithium carbonate, lithium oxide, and the like that are produced through the reaction with carbon dioxide, water, or oxygen in the ambient atmosphere. When a lithium metal layer is formed in advance on the surface of the negative electrode current collector by a method other than the electrochemical method, thereafter, on the surface of the previously formed lithium metal layer, a lithium metal layer is further formed by electrochemical deposition, resulting in the lithium metal layer having two- or more-layered structure.

Among the positive electrode additives, the decomposition product of the lithium iron-containing oxide or of the lithium nickel-containing oxide can leach into the electrolyte and migrate to the negative electrode. Therefore, when the positive electrode material mixture contains a positive electrode additive, the negative electrode may contain Fe element and/or Ni element.

The oxalate complex anion in the oxalate complex salt may contain boron and/or phosphorus. Specific examples of the oxalate complex anion include bis(oxalato)borate anion ($B(C_2O_4)_2^-$), difluoro(oxalato)borate anion ($BF_2(C_2O_4)^-$), $PF_4(C_2O_4)-$, and $PF_2(C_2O_4)_2^-$. These may be used singly or in combination of two or more kinds.

The oxalate complex anion is considered to act on the lithium ions in the electrolyte, which allows the lithium metal to be uniformly deposited in a fine particle form. Therefore, the growth of dendrites associated with local deposition of lithium metal, the uneven progress of charge and discharge reactions, and the like can be suppressed. As the oxalate complex anion, bis(oxalato)borate anion and/or difluoro(oxalato)borate anion is preferred.

The concentration of the oxalate complex salt contained in the electrolyte is not limited, but in view of reducing the viscosity of the electrolyte and ensuring high ion conductivity, for example, is 0.01 mol/L or more and 2 mol/L or less, and may be 0.1 mol/L or more and 1 mol/L or less.

The electrolyte may also contain at least one of $LiPF_6$ and lithium bis(fluorosulfonyl)imide, for ensuring high ion conductivity and achieving more excellent cycle characteristics and higher charge and discharge efficiency.

The total concentration of the lithium salt in the electrolyte is, for example, 0.5 mol/L or more, may be 1 mol/L or more, and may be 1.5 mol/L or more. When the concentration of the lithium salt is in the range as above, the high lithium ion conductivity of the electrolyte tends to be ensured. On the other hand, the concentration of the lithium salt in the electrolyte may be 3 mol/L or less, and may be 2 mol/L or less. In this case, the number of solvent molecules to solvate with lithium ions can be reduced, and the charge and discharge reactions can be efficiently performed. In particular, it is preferable that the total concentration of the oxalate complex salt, $LiPF_6$ and lithium bis(fluorosulfonyl) imide is within the above concentration range.

The components of the lithium secondary battery will be further described below, with reference to the drawings, but the following drawings and the like are not intended to limit the present invention.

Figure 1:
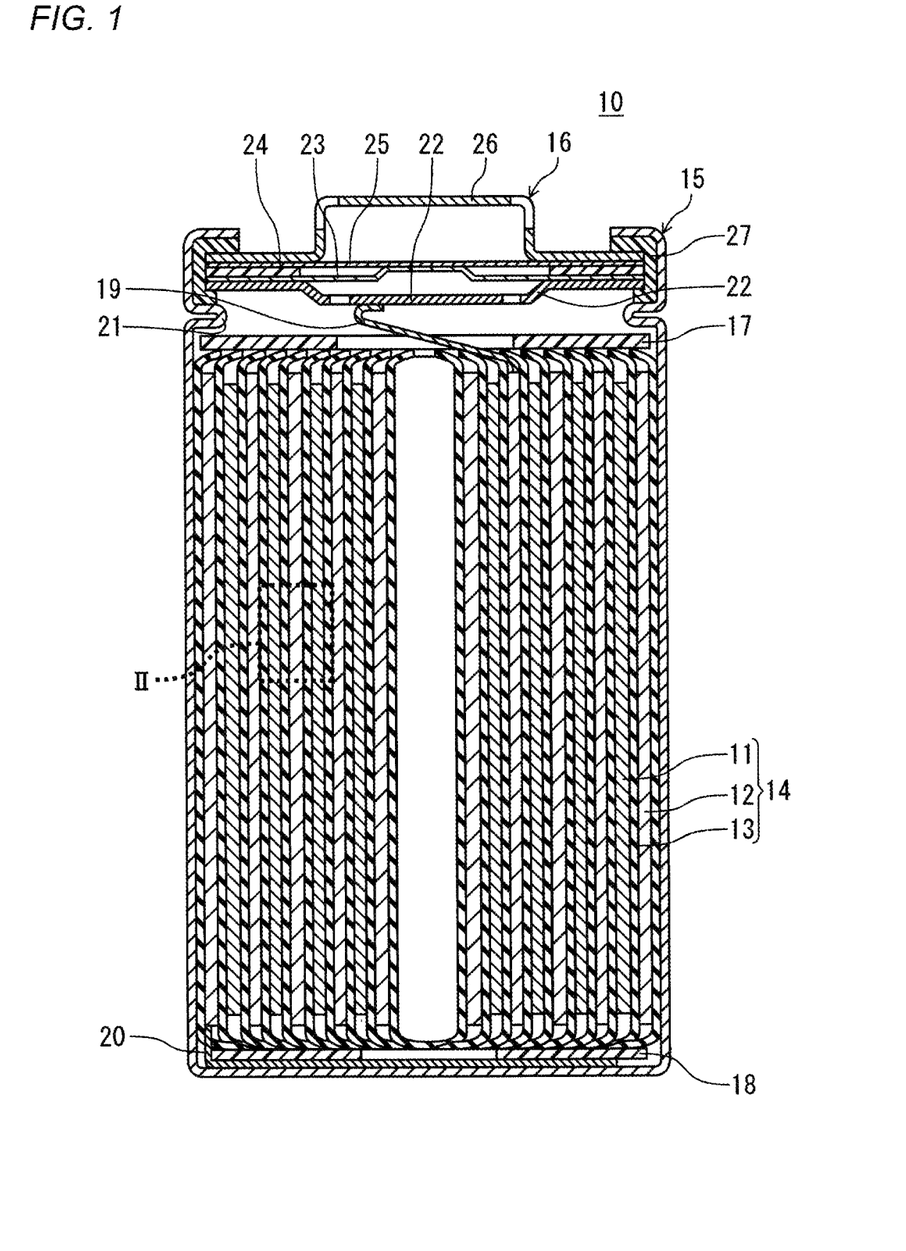
FIG. 1 A schematic vertical cross-sectional view of a lithium secondary battery according to one embodiment of the present disclosure.
Figure 2:
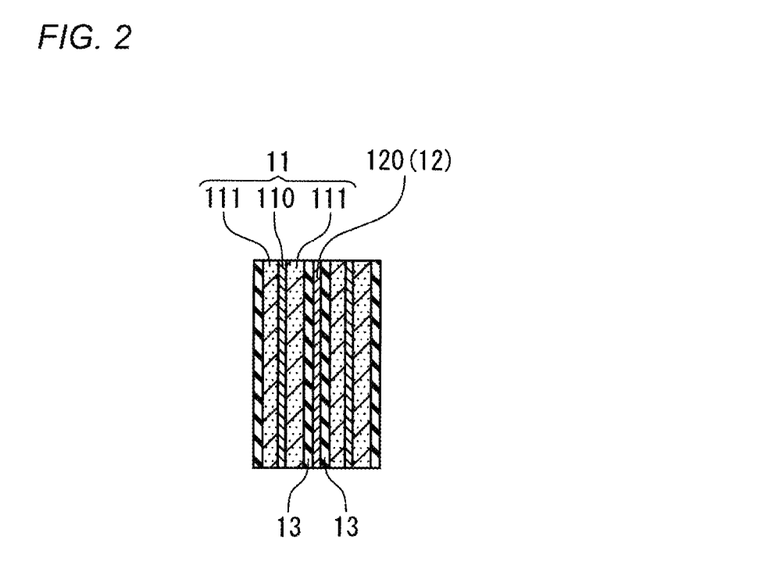
FIG. 2 An enlarged cross-sectional view schematically showing a region II of FIG. 1 in a fully discharged condition of the lithium secondary battery before the first charge (i.e., immediately after battery fabrication).
Figure 3:
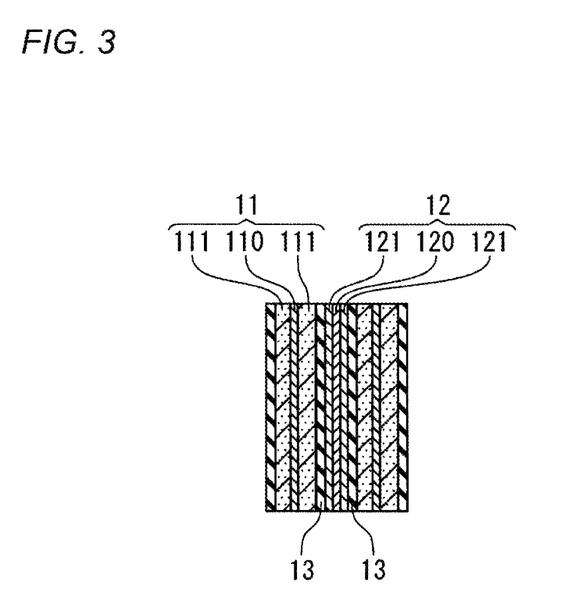
FIG. 3 A schematic enlarged cross-sectional view of the region II of FIG. 1 in a fully discharged condition of the lithium secondary battery after the first charge.

FIG. 1 is a schematic vertical cross-sectional view of a lithium secondary battery according to one embodiment of the present disclosure. FIGS. 2 and 3 are enlarged cross-sectional views schematically showing the region II of FIG. 1.

A lithium secondary battery 10 includes a battery case which is, for example, cylindrical in shape, a wound electrode group 14 housed in the battery case, and an electrolyte (not shown). The battery case is constituted of a case main body 15 which is, for example, a bottomed cylindrical metal container, and a sealing body 16 sealing the opening of the case main body 15. A gasket 27 may be disposed between the case main body 15 and the sealing body 16. The case main body 15 has, for example, a step portion 21 formed annularly along the circumference of the case main body 15. The sealing body 16 is supported on the step portion 21 on the opening side. The sealing body 16 includes a filter 22, a lower valve body 23, an electrically insulating member 24, an upper valve body 25, and a cap 26, in this order from the inside of the case main body 15. In the case main body 15, electrically insulating plates 17 and 18 may be disposed respectively at both ends of the electrode group 14 in the winding axial direction.

The electrode group 14 is formed by spirally winding a positive electrode 11 and a negative electrode 12 each having a belt-like shape, with a separator 13 interposed therebetween. The positive electrode 11 is electrically connected to the cap 26 which, for example, also serves as a positive electrode terminal, via a positive electrode lead 19. The negative electrode 12 is electrically connected to the case main body 15 which, for example, also serves as a negative electrode terminal, via a negative electrode lead 20.

As shown in FIG. 2, the positive electrode 11 includes a positive electrode current collector 110 and a positive electrode material mixture layer 111 disposed on both surfaces of the positive electrode current collector 110. The negative electrode 12 includes a negative electrode current collector 120. FIG. 2 shows a cross section immediately after the battery fabrication, that is, in a fully discharged condition before the first charge. In FIG. 2, no lithium metal is deposited on the surface of the negative electrode current collector 120. On the other hand, FIG. 3 shows a cross section in a fully discharged condition after the first charge. In FIG. 3, a lithium metal layer 121 corresponding to an irreversible capacity is formed on the surface of the negative electrode current collector 120.

(Positive Electrode)

In the positive electrode 11, the positive electrode material mixture layer 111 may be formed on both surfaces of the positive electrode current collector 110, and may be formed on one surface thereof. In a region where the positive electrode 11 is connected to the positive electrode lead 19 and/or a region not facing the negative electrode 12, the positive electrode material mixture layer 111 may be formed only on one surface of the positive electrode current collector 110. The positive electrode material mixture layer 111 contains a positive electrode active material and a positive electrode additive as essential components, and may contain one or more optional components, such as an electrically conductive material and a binder.

The positive electrode 11 is obtained, for example, by applying a slurry containing a positive electrode material mixture and a dispersion medium, onto a surface of the positive electrode current collector 110, drying the applied film, and rolling. As the dispersion medium, water and/or an organic medium is used. A carbon material with electrical conductivity may be applied onto the surface of the positive electrode current collector 110, if necessary.

The positive electrode active material can be a material that absorbs and releases lithium ions. Examples of the positive electrode active material include a lithium-containing transition metal oxide, a transition metal fluoride, a polyanion, a fluorinated polyanion, and a transition metal sulfide.

Examples of the transition metal element contained in the lithium-containing transition metal oxide include Sc, Ti, V, Cr, Mn, Fe, Co, Ni, Cu, Y, Zr, and W. The lithium-containing transition metal oxide may contain one kind or two or more kinds of transition metal elements. The transition metal element may include Co, Ni, and/or Mn. The lithium-containing transition metal oxide may contain one kind or two or more kinds of typical metal elements, if necessary. Examples of the typical metal element include Mg, Al, Ca, Zn, Ga, Ge, Sn, Sb, Pb, and Bi. The typical metal element may be Al, or the like.

The crystal structure of the positive electrode active material is not limited, and a positive electrode active material having a crystal structure belonging to the space group R-3m may be used. Such a positive electrode active material exhibits relatively small expansion and contraction in its lattice during charge and discharge, and is unlikely to degrade, which is effective in achieving excellent cycle characteristics. The positive electrode active material having a rock-salt type layered crystal structure belonging to the space group R-3m may contain, for example, Ni, Co, and Mn and/or Al. In such a positive electrode active material, the proportion of Ni in the total number of Ni, Co, Mn, and Al atoms may be 50 atom % or more. For example, when the positive electrode active material contains Ni, Co, and Al, the proportion of Ni may be 50 atom % or more, and may be 80 atom % or more. When the positive electrode active material contains Ni, Co, and Mn, the proportion of Ni may be 50 atom % or more.

The conductive material is, for example, a carbon material. Examples of the carbon material include carbon black, carbon nanotubes, and graphite. Examples of the carbon black include acetylene black and Ketjen black.

Examples of the binder include fluorocarbon resin, polyacrylonitrile, polyimide resin, acrylic resin, polyolefin resin, and rubbery polymer. Examples of the fluorocarbon resin include polytetrafluoroethylene, and polyvinylidene fluoride.

The material of the positive electrode current collector 110 may be, for example, a metal material containing Al, Ti, Fe, or the like. The metal material may be Al, an Al alloy, Ti, a Ti alloy, a Fe alloy, or the like. The Fe alloy may be stainless steel. The positive electrode current collector 110 is in the form of foil, film or the like, and may be porous. The thickness of the positive electrode current collector 110 is, for example, 5 µm or more and 30 µm or less.

(Negative Electrode)

On the negative electrode 12, lithium metal deposits during charge. More specifically, lithium ions contained in the electrolyte receive electrons at the negative electrode 12 during charge and become lithium metal, which deposits on the negative electrode 12. The lithium metal deposited on the negative electrode 12 dissolves as lithium ions into the electrolyte during discharge. The lithium ions contained in the electrolyte may be either derived from the lithium salt added to the electrolyte, or supplied from the positive electrode active material during charge, or both.

The negative electrode 12 includes a negative electrode current collector 120. The negative electrode current collector 120 is usually constituted of an electrically conductive sheet. The conductive sheet is composed of an electrically conductive material. The conductive material may be a metal material, such as a metal or an alloy. The metal material may be a material that does not react with lithium, i.e., a material that forms neither an alloy nor an intermetallic compound with lithium. Examples thereof include copper, nickel, iron, and alloys containing these metal elements. In particular, copper and/or a copper alloy is preferred, also in terms of the cost. The content of copper in the copper alloy may be 50 mass % or more, and may be 80 mass % or more. The negative electrode current collector 120 is in the form of a foil, a film or the like, and may be porous. The thickness of the negative electrode current collector 120 is, for example, 5 µm or more and 20 µm or less.

In view of ease of ensuring a high volume energy density, the negative electrode 12 may include the negative electrode current collector 120 only, before the first charge, i.e., immediately after the fabrication, of the lithium secondary battery.

In the present disclosure, given that the rated capacity of the lithium secondary battery is denoted by C, a fully discharged condition refers to a state where the battery has reached a discharged state (DoD: Depth of Discharge) of equal to or lower than C multiplied by 0.05 (0.05C). For example, it refers to a state in which the battery is discharged at a constant current of 0.05C to a lower limit voltage. The lower limit voltage is, for example, 2.5 V.

(Electrolyte)

The electrolyte contains a solvent and a solute dissolved in the solvent. Various lithium salts can be used for the solute. The concentration of the lithium salt in the electrolyte is, for example, 0.5 to 2 mol/L. The electrolyte may contain one or more known additives.

The solvent may include, for example, a non-aqueous solvent, such as a cyclic carbonic acid ester, a chain carbonic acid ester, a cyclic carboxylic acid ester, a chain carboxylic acid ester, a chain ether, or a cyclic ether, or water. The solvent may be used singly or in combination of two or more kinds. In particular, it is preferable to include at least one selected from the group consisting of a cyclic carbonic acid ester, a chain carbonic acid ester, a cyclic carboxylic acid ester, a chain carboxylic acid ester, a chain ether, and a cyclic ether, as a main solvent. The content by volume of the main solvent in the whole solvent is, for example, 50 vol % or more, may be 60 vol % or more, and may be 70 vol % or more or 80 vol % or more.

Examples of the cyclic carbonic acid ester include ethylene carbonate (EC), fluoroethylene carbonate (FEC), propylene carbonate (PC), butylene carbonate, vinylene carbonate, vinyl ethylene carbonate, and derivatives thereof. In view of the ion conductivity of the electrolyte, it is preferable to use at least one selected from the group consisting of ethylene carbonate, fluoroethylene carbonate, and propylene carbonate.

Examples of the chain carbonic aid include diethyl carbonate (DEC), ethyl methyl carbonate (EMC), and dimethyl carbonate (DMC).

Examples of the cyclic carboxylic acid ester include γ-butyrolactone (GBL) and γ-valerolactone (GVL).

Examples of the chain carboxylic acid ester include methyl acetate (MA), ethyl acetate (EA), propyl acetate, methyl propionate, ethyl propionate, and propyl propionate.

Examples of the cyclic ether include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane,1,3,5-trioxane, furan, 2-methylfuran, 1,8-cineol, and crown ether.

Examples of the chain ether include dimethyl ether, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-dimethoxyethane, 1,2-diethoxyethane, 1,2-butoxyethane, diethyleneglycol dimethylether, diethyleneglycol diethylether, diethyleneglycol dibutylether, 1,1-dimethoxymethane, 1,1-diethoxyethane, 1,2-diethoxyethane, triethyleneglycol dimethylether, and tetraethyleneglycol dimethylether.

Note that the lowest unoccupied molecular orbital (LUMO) of the ether is at a high energy level. Therefore, even when coming in contact with a lithium metal having a strong reducing power, the ether is unlikely to be reductively decomposed. In addition, the oxygen in the ether skeleton strongly interacts with lithium ions, and therefore, can easily dissolve the lithium salt. In light of these properties, ethers are suitable for use as a solvent for the electrolyte in a lithium secondary battery. On the other hand, when the interaction between the ether and lithium ions is too strong, the desolvation energy of the ether for lithium ions increases, and lithium ions become captured by the ether molecules, and as a result, lithium ions are hardly reduced to lithium metal on the surface of the negative electrode.

In view of the foregoing, ethers may be fluorinated. For example, a fluorinated ether having a fluorination rate of 40% or more may be used. In this case, the charge and discharge reactions can be allowed to proceed more evenly. The fluorination rate may be 60% or more, and may be 70% or more.

In the present disclosure, the fluorination rate of the fluorinated ether refers to a ratio of the number of fluorine atoms to the total number of fluorine atoms and hydrogen atoms in the fluorinated ether, which is expressed by a percentage (%). Therefore, the fluorination rate is equivalent to a substitution ratio of hydrogen atoms for the fluorine atoms in an ether obtained by substituting all the fluorine atoms in the fluorinated ether by hydrogen atoms, expressed by a percentage (%).

Specific examples of the fluorinated ether include a fluorinated (poly)ethylene glycol dialkyl ether, in which the alkyl group has, for example, one to six carbon atoms, may have one to four carbon atoms, and may have one or two carbon atoms.

Examples of the lithium salt include an oxalate complex salt, $LiPF_6$, lithium bis(fluorosulfonyl)imide ($LiN(SO_2F)_2$), and further include $LiBF_4$, $LiClO_4$, $LiAsF_6$, $LiCF_3SO_3$, and $LiN(SO_2CF_3)_2$. The lithium salt may be a combination of two or more kinds of these salts.

(Separator)

For a separator 13, a porous sheet having ion permeability and electron insulating properties is used. Examples of the porous sheet include a microporous film, a woven fabric, and a nonwoven fabric. The material of the separator is not limited, but is preferably a polymer material, such as an olefin resin, a polyamide resin, and a cellulose. Examples of the olefin resin include polyethylene, polypropylene, and an olefin copolymer containing at least one of ethylene and propylene, as a monomer unit. The separator 13 may contain an additive, if necessary. Examples of the additive include an inorganic filler.

In FIG. 1, a cylindrical lithium secondary battery including a cylindrical battery case is described, but the lithium secondary battery according to the present disclosure is not limited thereto. The lithium secondary battery according to the present disclosure is applicable to, for example, a prismatic battery including a prismatic battery case, a laminate battery including a resin outer case, such as an aluminum laminate sheet, and the like. The electrode group is also not limited to the wound electrode group, and may be, for example, a stacked electrode group formed by stacking a plurality of positive electrodes and a plurality of negative electrodes are alternately stacked, with a separator interposed between the positive and negative electrodes.

EXAMPLES

A lithium secondary battery according to the present disclosure will be specifically described below with reference to Examples and Comparative Examples. It is to be noted, however, the present disclosure is not limited to the following Examples.

Examples 1 to 3 and Comparative Examples 1 to 5

A lithium secondary battery was fabricated in the following procedure.

(1) Production of Positive Electrode 11

A positive electrode active material, a positive electrode additive as shown in Table 1 ($Li_5FeO_4$, $Li_2NiO_2$), acetylene black (conductive agent: AB), and polyvinylidene fluoride (binder: PVdF) were mixed in a mass ratio of (positive electrode active material+positive electrode additive):AB:PVdF=95:2.5:2.5. The content of the positive electrode additive in the positive electrode material mixture was set as shown in Table 1. To the mixture, N-methyl-2-pyrrolidone was added as a dispersion medium in an appropriate amount, and mixed together, to prepare a positive electrode material mixture slurry. The positive electrode active material used here was a lithium-containing transition metal oxide containing Ni, Co, and Al and having a crystal structure belonging to the space group R-3m.

The positive electrode material mixture slurry was applied onto both surfaces of an aluminum foil serving as a positive electrode current collector 110, and dried. The dry material was compressed in the thickness direction using a roller. The obtained stack was cut in a predetermined electrode size, to form a positive electrode 11 having a positive electrode material mixture layer 111 on both surfaces of the positive electrode current collector 110. The positive electrode 11 was provided with an exposed portion which had no positive electrode material mixture layer 111 and from which the positive electrode current collector 110 was exposed. To the exposed portion of the positive electrode current collector 110, one end of a positive electrode lead 19 made of aluminum was attached by welding.

(2) Production of Negative Electrode 12

An electrolytic copper foil having a thickness of 10 μm was cut in a predetermined electrode size, to form a negative electrode current collector 120. The negative electrode current collector 120 was used as a negative electrode 12, for fabricating a battery. To the negative electrode current collector 120, one end of a negative electrode lead 20 made of nickel was attached by welding.

(3) Preparation of Non-Aqueous Electrolyte

A lithium salt as shown in Table 1 (LiPF$_6$, lithium difluoro(oxalato)borate (LiFOB)) was dissolved at a concentration as shown in Table 1, in a mixed solvent of fluoroethylene carbonate (FEC), ethyl methyl carbonate (EMC) and dimethyl carbonate (DMC) mixed in a volume ratio of 4:1:15 as shown in Table 1, to prepare a non-aqueous electrolyte.

(4) Fabrication of Battery

In an inert gas atmosphere, the positive electrode 11 obtained in the above (1) and the negative electrode 12 obtained in the above (2) were laminated, with a microporous film made of polyethylene serving as a separator 13 interposed therebetween, and wound spirally to form an electrode group. The obtained electrode group was housed in a bag-like outer case formed of a laminate sheet having an Al layer, into which the non-aqueous electrolyte was injected. Then, the outer case was sealed, to complete a lithium secondary battery.

(5) Evaluation

The lithium secondary batteries obtained in the Examples and Comparative Examples were subjected to a charge and discharge test in the following procedure, to evaluate a retention ratio of the capacity at the 50th cycle to the initial capacity.

First, in a 25° C. constant temperature bath, the lithium secondary batteries were charged under the conditions below, and after the rest for 20 min, discharged under the conditions below.

(Charge)

A constant-current charge was performed at a current of 0.2 It until the battery voltage reached 4.1 V, and then a constant-voltage charge was performed at a voltage of 4.1 V until the current value reached 0.02 It.

(Discharge)

A constant-current discharge was performed with a current of 0.2 It until the battery voltage reached 3.0 V.

With the above charge and discharge taken as one cycle, a charge and discharge test consisting of 50 cycles was performed. The discharge capacity at the 1st cycle was measured as the initial discharge capacity. The ratio of the discharge capacity at the 50th cycle to the initial discharge capacity was determined as a capacity retention ratio (%).

The results of Examples 1 to 3 and Comparative Examples 1 to 5 are shown in Table 1. Examples 1 to 3 correspond to batteries A1 to A3, and Comparative Examples 1 to 5 correspond to batteries R1 to R5.

TABLE 1

|  | Solvent composition | Lithium salt LiPF$_6$ (M) | Lithium salt LiFOB (M) | Positive electrode additive Li$_5$FeO$_4$ (wt %) | Positive electrode additive Li$_2$NiO$_2$ (wt %) | 50 cycle capacity retention ratio (%) |
|---|---|---|---|---|---|---|
| A1 | FEC/EMC/DMC = 4/1/15 | 1 | 0.5 | 10 | 0 | 86.9 |
| A2 | FEC/EMC/DMC = 4/1/15 | 1 | 0.5 | 0 | 5 | 83.2 |
| A3 | FEC/EMC/DMC = 4/1/15 | 1 | 0.5 | 0 | 10 | 88.8 |
| R1 | FEC/EMC/DMC = 4/1/15 | 1 | 0.5 | 0 | 0 | 65.3 |
| R2 | FEC/EMC/DMC = 4/1/15 | 1 | 0 | 10 | 0 | 73.7 |
| R3 | FEC/EMC/DMC = 4/1/15 | 1 | 0 | 0 | 0 | 61.5 |
| R4 | FEC/EMC/DMC = 4/1/15 | 1 | 0 | 0 | 5 | 62.4 |
| R5 | FEC/EMC/DMC = 4/1/15 | 1 | 0 | 0 | 10 | 69.6 |

As shown in Table 1, in the batteries A1 to A3 in which LiFOB was included, and a positive electrode additive was added to the positive electrode, the side reaction between the electrolyte and the lithium metal was suppressed, and the discharge capacity was highly retained even after 50 cycles, exhibiting excellent cycle characteristics.

Examples 4 to 7 and Comparative Examples 6 to 11

A positive electrode active material, a positive electrode additive as shown in Table 1 (Li$_5$FeO$_4$, Li$_2$NiO$_2$), acetylene black (conductive agent: AB), and polyvinylidene fluoride (binder: PVdF) were mixed in a mass ratio of (positive electrode active material+positive electrode additive):AB:PVdF=95:2.5:2.5, and a positive electrode was produced in the same manner as in Examples 1 to 3 etc. above. The negative electrode current collector 120 similar to the above was prepared as the negative electrode 12. The content of the positive electrode additive in the positive electrode material mixture was set as shown in Table 2.

A lithium salt as shown in Table 2 (lithium bis(fluorosulfonyl)imide (LiFSI), lithium difluoro(oxalato)borate (LiFOB)) was dissolved at a concentration as shown in Table 2, in a mixed solvent of dimethoxyethane (DME) and 1,1,2,2-tetrafluoroethyl-2,2,2-trifluoroethyl ether (fluorination rate: 70%) (HFE) mixed in a volume ratio of 1:2 as shown in Table 2, to prepare a non-aqueous electrolyte.

Batteries were prepared in the same manner as in Examples 1 to 3 etc. except the above, and evaluated similarly. The results of Examples 4 to 7 and Comparative Examples 6 to 11 are shown in Table 2. Examples 4 to 7 correspond to batteries A4 to A7, and Comparative Examples 6 to 11 correspond to batteries R6 to R11.

TABLE 2

|  | Solvent composition | Lithium salt LiFSI (M) | Lithium salt LiFOB (M) | Positive electrode additive $Li_5FeO_4$ (wt %) | Positive electrode additive $Li_2NiO_2$ (wt %) | 50 cycle capacity retention ratio (%) |
|---|---|---|---|---|---|---|
| A4 | DME/HFE = 1/2 | 1 | 0.5 | 10 | 0 | 91.4 |
| A5 | DME/HFE = 1/2 | 1 | 0.1 | 10 | 0 | 94 |
| A6 | DME/HFE = 1/2 | 1 | 0.5 | 0 | 5 | 90.6 |
| A7 | DME/HFE = 1/2 | 1 | 0.5 | 0 | 10 | 95.5 |
| R6 | DME/HFE = 1/2 | 1 | 0.5 | 0 | 0 | 84.7 |
| R7 | DME/HFE = 1/2 | 1 | 0 | 10 | 0 | 84.1 |
| R8 | DME/HFE = 1/2 | 1 | 0.1 | 0 | 0 | 86.3 |
| R9 | DME/HFE = 1/2 | 1 | 0 | 0 | 0 | 84.8 |
| R10 | DME/HFE = 1/2 | 1 | 0 | 0 | 5 | 84.6 |
| R11 | DME/HFE = 1/2 | 1 | 0 | 0 | 10 | 85.2 |

As shown in Table 2, in the batteries A4 to A7, the discharge capacity was highly retained even after 50 cycles, exhibiting excellent cycle characteristics.

INDUSTRIAL APPLICABILITY

The lithium secondary battery according to the present disclosure is excellent in cycle characteristics. The lithium secondary battery according to the present disclosure is useful for various applications, such as electronic devices like cellular phones, smart phones, and tablet terminals, electric vehicles including hybrids and plug-in hybrids, and home storage battery systems combined with a solar cell.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10 lithium secondary battery
11 positive electrode
12 negative electrode
13 separator
14 electrode group
15 case main body
16 sealing body
17, 18 insulating plate
19 positive electrode lead
20 negative electrode lead
21 step portion
22 filter
23 lower valve body
24 insulating member
25 upper valve body
26 cap
27 gasket
110 positive electrode current collector
111 positive electrode material mixture layer
120 negative electrode current collector
121 lithium metal layer

The invention claimed is:

1. A cylindrical lithium secondary battery, comprising:
a positive electrode including a positive electrode material mixture containing a positive electrode active material and a positive electrode additive;
a negative electrode including a negative electrode current collector;
a separator disposed between the positive electrode and the negative electrode; and
an electrolyte, wherein
on the negative electrode, lithium metal deposits during charge and the lithium metal dissolves in the electrolyte during discharge,
the positive electrode additive includes at least one selected from the group consisting of a first compound represented by a general formula (1): $Li_{a1}Fe_{x1}M1_{y1}O_{z1}$ and a second compound represented by a general formula (2): $Li_{a2}Ni_{x2}M2_{y2}O_{z2}$,
the general formula (1) before first charge, the a1, x1, y1, and z1 satisfy $4 \leq a1 \leq 5$, $0.8 \leq x1 \leq 1$, $x1+y1=1$, and $3.5 \leq z1 \leq 4$,
the M1 includes at least one selected from the group consisting of Co, Cu, Mg, Ni, Mn, Zn, Al, Ga, Ge, Ti, Si, Sn, Ce, Y, Zr, S, and Na,
the general formula (2) before first charge, the a2, x2, y2, and z2 satisfy $1 < a2 \leq 2$, $0.8 \leq x2 \leq 1$, $x2+y2=1$, and $1.5 \leq z2 \leq 2$,
the M2 includes at least one selected from the group consisting of Co, Cu, Mg, Fe, Mn, Zn, Al, Ga, Ge, Ti, Si, Sn, Ce, Y, Zr, S, and Na,
the electrolyte contains an oxalate complex salt having an oxalate complex anion and a lithium ion,
wherein the electrolyte contains the oxalate complex salt at a concentration of 0.01 mol/L or more and 2 mol/L or less,
wherein the oxalate complex anion is a difluoro (oxalato) borate anion,
wherein the electrolyte further contains at least one of $LiPF_6$ and lithium bis(fluorosulfonyl)imide,
wherein the positive electrode material mixture contains 0.1 mass % or more and 20 mass % or less of the positive electrode additive, and
wherein in a fully discharged condition, the negative electrode has a lithium metal layer having a thickness of 5 μm or more and 30 μm or less on a surface of the negative electrode current collector.

2. The cylindrical lithium secondary battery according to claim 1, wherein the negative electrode current collector is a copper foil or a copper alloy foil.

3. The cylindrical lithium secondary battery according to claim 1, wherein the negative electrode contains at least one of an Fe element and a Ni element.

4. The cylindrical lithium secondary battery according to claim 1, wherein the electrolyte contains an ether as a main solvent which constitutes 50 vol % or more of a whole solvent.

5. The cylindrical lithium secondary battery according to claim 4, wherein the ether contains a fluorinated ether.

6. The cylindrical lithium secondary battery according to claim 1, wherein M1 in the general formula (1) includes Al, and $0<y1$.

* * * * *